May 3, 1960 W. R. KOCH 2,935,607

FREQUENCY VARIATION RESPONSE CIRCUIT

Filed Feb. 9, 1959 2 Sheets-Sheet 1

INVENTOR.
WINFIELD R. KOCH
BY
ATTORNEY

May 3, 1960 W. R. KOCH 2,935,607

FREQUENCY VARIATION RESPONSE CIRCUIT

Filed Feb. 9, 1959 2 Sheets-Sheet 2

INVENTOR.
WINFIELD R. KOCH
BY
W. H. [signature]
ATTORNEY 2,935,607

FREQUENCY VARIATION RESPONSE CIRCUIT

Winfield R. Koch, Marlton, N.J., assignor to Radio Corporation of America, a corporation of Delaware Application February 9, 1959, Serial No. 792,020

9 Claims. (Cl. 250—20)

This invention relates to frequency variation response circuits and more particularly to circuits to demodulate a frequency modulated wave.

In order to secure the noise reducing benefits that may be derived from frequency modulation signal transmission, it is necessary not only to demodulate the frequency modulated wave, but also to prevent amplitude variations of the frequency modulated wave from affecting the detected output signal. This may be accomplished, as is well known, by clipping the amplitude of the frequency modualted wave before it is demodulated or by rendering the frequency modulation detector circuit insensitive to amplitude variations of the frequency modulated wave.

Semi-conductor diodes and transistors have proved satisfactory when used with some types of detector circuits for frequency modulation waves. Transistorized circuits that clip the peaks of the frequency modulated wave have not, however, proved entirely satisfactory, since their action may be impaired because of the non-linear feedback capacitances that may exist in a transistor when driven into collector current saturation to provide clipping. This leads to unstable operation of the clipper circuit and distortion of its response characteristics. These signal clipping circuits are generally called "limiters"; however, in this specification the term "limiting" is used to mean the elimination in a demodulated signal of a frequency modulated wave of effects caused by amplitude variations of that wave.

It is, therefore, an object of this invention to provide an improved frequency modulation detector circuit.

It is another object of this invention to provide an improved circuit utilizing transistor devices for demodulating a frequency modulated wave.

It is another object of this invention to provide an improved limiter-detector circuit utilizing transistor devices for demodulating a frequency modulated wave.

It is a further object of this invention to provide an improved transistorized limiter-detector circuit for frequency modulated waves to reduce both the complexity and cost of transistorized frequency modulation detector circuits.

Briefly, the above and other objects of the invention are obtained by utilizing an oscillator-detector for the frequency modulated wave that oscillates at a frequency less than the frequency of the wave to be detected. At least one mixer-limiter is provided for driving the oscillator-detector stage, in which the wave to be demodulated is mixed with the oscillator wave from the oscillator-detector. The difference frequency available at the output of the mixer-limiter serves to lock the frequency of oscillations of the oscillator-detector stage into those of the received signal, but at a reduced frequency. The limiting action of the circuit is provided by the mixer-limiter action, and the detected output signal is available from the oscillator-detector circuit because of a frequency deviation responsive phase shift between the locking wave and the oscillator wave.

The invention may be more fully understood when the following description is read with reference to the accompanying drawings in which.

Figure 1:
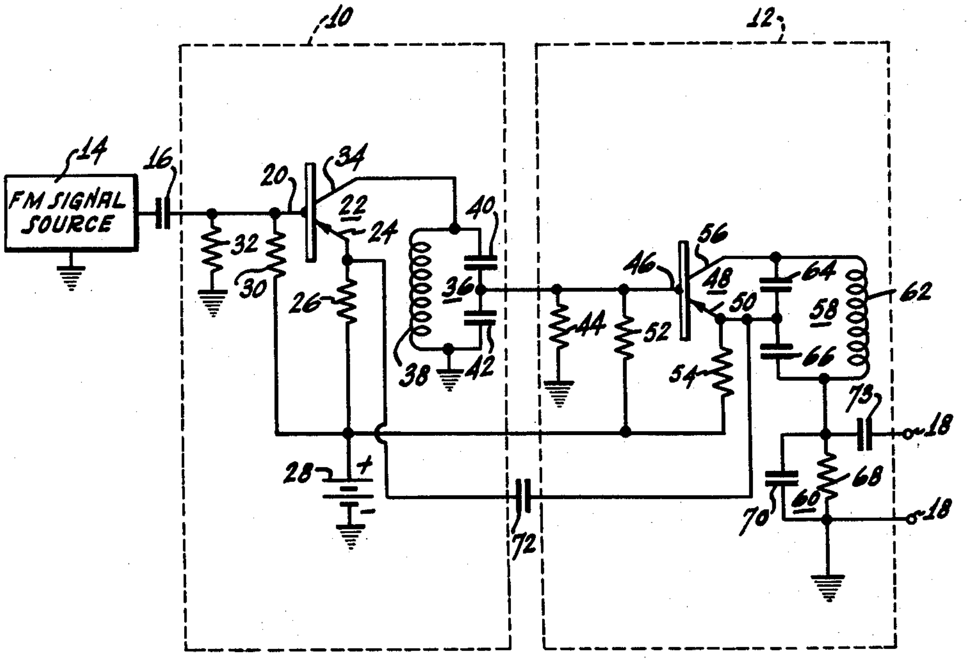
Figure 1 is a schematic circuit diagram of a frequency modulation limiter-detector circuit in accordance with the invention.

Referring now to the drawings, and in particular to Figure 1, a frequency modulation detector circuit in accordance with the invention includes basically, a mixer-limiter circuit 10 (enclosed within the dotted rectangle 10) and an oscillator-detector circuit 12 (enclosed within the dotted rectangle 12). A frequency modulated (FM) wave from an FM signal source 14 is applied through a coupling capacitor 16 to the mixer-limiter circuit 10, which is also supplied with an oscillator signal from the oscillator-detector circuit 12 that has a frequency less than that of the FM wave. The output signal of the mixer-limiter circuit 10, which is the difference frequency between the FM wave and the oscillator signal, is applied to the oscillator-detector circuit 12, where the frequency of oscillations lock into the difference frequency at some ratio different than unity. The frequency deviations of the FM wave deviate both the difference frequency and the frequency of oscillations. The detected output signal is available at a pair of output terminals 18 of the oscillator-detector circuit 12.

In more specific detail, the FM wave is applied through the coupling capacitor 16 to the base electrode 20 of a mixer-limiter transistor 22. Operating bias is supplied to the mixer-limiter transistor 22 by connecting its emitter electrode 24 through a stabilizing resistor 26 to the positive terminal of a battery 28, the negative terminal of which is connected to ground or a point of reference potential for the circuit. The base electrode 20 is connected to the positive terminal of the battery 28 through a bias resistor 30, and to ground through a second bias resistor 32 to provide proper bias therefor. The collector electrode 34 is connected to ground through a parallel resonant or tank circuit 36, which includes an inductor 38 across which is connected a pair of serially connected capacitors 40 and 42. As will be more fully explained hereinafter, the tank circuit 36 is tuned to a frequency less than that of the FM wave. An oscillator signal having an amplitude less than that of the FM wave is also supplied to the mixer circuit, as will be more fully explained hereinafter.

The output signal of the mixer-limiter stage 10 is developed across the tank circuit 36 and is applied from the junction of the capacitors 40 and 42 (which provides a low impedance driving source) to the base electrode 46 of an oscillator-detector transistor 48. The oscillator-detector transistor 48 is supplied with operating bias in a manner similar to that of the mixer-limiter transistor 22 by having its base electrode 46 and emitter electrode 50 connected to the positive terminal of the battery 28 through resistors 52 and 54, respectively. The base electrode 46 is also connected to ground through a bias resistor 44. The collector electrode 56 of the oscillator-detector transistor 48 is connected through a second tank circuit 58 and a resistance-capacitance circuit 60 to ground for the circuit. The second tank circuit 58 comprises an inductor 62 and a pair of serially connected capacitors 64 and 66 connected thereacross and is tuned to the frequency of oscillations of the circuit; and the resistance capacitance network 60 comprises an output resistor 68 connected in parallel with an integrating capacitor 70. A coupling capacitor 73 is connected between one output terminal 18 and the ungrounded end of the output resistor 68. The remaining output terminal 18 is connected to ground.

The operation of the circuit can best be described by choosing values for the frequencies of the signals to be utilized in the circuit. Assume, then, that the frequency of the FM signal source is 4.5 megacycles (mc.). This frequency is selected as illustrative since it is the frequency of the sound intermediate frequency signal utilized in an intercarrier television receiver. As has been before noted, the output signal of the mixer-limiter circuit 10 locks in the oscillations in the oscillator-detector circuit 12. The frequency relationships in the entire circuit are then given by the following equations: $f-f_0=f_1$ and $f_1=Kf_0$, where $f$ is the frequency of the wave to be detected (4.5 mc. in this example), $f_0$ is the oscillator frequency, $f_1$ is the difference frequency or output frequency of the mixer-limiter circuit 10, and K is the locking ratio desired between the difference frequency and the frequency of oscillations. These equations indicate that difference frequency between the frequency of the FM signal wave and the frequency of oscillations bears an integral harmonic relationship (of the third harmonic or greater) to half the frequency of oscillations. If a three to two locking ratio is chosen, the frequency of oscillations of the oscillator-detector circuit 12 is then 1.8 mc., and the difference frequency is 2.7 mc.

In order to provide the mixing action previously mentioned, a portion of oscillator signal is derived from the emitter electrode 50 of the oscillator-detector transistor 48 and applied through a capacitor 72 to the emitter electrode 24 of the mixer-limiter transistor 22. To provide limiting action the amplitude of the oscillator signal is less than that of the FM wave. Thus the mixer-limiter transistor 22 has a signal with a frequency of 4.5 mc. applied to its base electrode 20 and a signal with the frequency of 1.8 mc. applied to its emitter electrode 24. Since the transistor device 22 is a non-linear circuit element, the usual heterodyne products may be derived from the collector electrode 34. These heterodyne products will include the difference signal between the 4.5 mc. signal and the 1.8 mc. signal, or 2.7 mc. The tank circuit 36 is tuned to this frequency (2.7 mc.). The 2.7 mc. signal that appears in the tank circuit 36 is then coupled to the base electrode 46 of the oscillator-detector transistor 48 and the frequency of the oscillations (1.8 mc.) lock into the frequency of 2.7 mc. signal at a three to two ratio.

So far the description has assumed that the 4.5 mc. signal is unmodulated. If the 4.5 mc. signal is modulated to a maximum deviation of ±25 kilocycles (kc.), as in television broadcasting, the 2.7 mc. signal appearing at the collector electrode 34 of the mixer-limiter transistor 22 will be deviated to a maximum deviation equal to the ratio of 2.7 to 4.5 times 25, or ±15 kc. Likewise, the oscillator signal of 1.8 mc. will be deviated by the ratio 1.8 to 2.7 times 15, or ±10 kc.

The detection of the oscillator signal is accomplished by the change in the phase between the 2.7 mc. input signal applied to the base electrode 46 and the 1.8 mc. oscillator signal appearing in the oscillator-detector circuit 12. Thus, at center frequency there will be a given phase relation between the two signals which will provide a normal average collector current for the transistor 48 which, when flowing through the output resistor 68 and integrated by the capacitor 70 connected thereacross, will develop a normal voltage between the output terminals 18. As the FM wave deviates in accordance with its modulating signal, the phase relation between the 2.7 mc. and 1.8 mc. signals will change. A deviation that increases the frequency will produce more collector current and thus a higher output voltage at the output terminals 18; and a deviation that decreases the frequency will produce a lower collector current and thus a lower voltage at the output terminals 18.

The limiting action is provided by the characteristics of the mixer-limiter circuit 10. As is known, the output signal of a mixer is proportional to the smaller of the two input signals (see "Vacuum Tube Circuits" by L. B. Arguimbau, John Wiley and Sons, Inc., New York, 1948). If then, the oscillator signal is made less than the signal of the FM wave applied to the mixer-limiter circuit 10, the output will remain substantially constant despite amplitude changes of the FM wave which would normally cause a change in the collector current of the oscillator-detector transistor 48.

A circuit constructed in accordance with the circuit diagram of Figure 1 utilized the following component values:

| | |
|---|---|
| Transistor **22** | Type 2N247. |
| Transistor **48** | Type 2N140. |
| Capacitor **16** | 820 μμf. |
| Capacitor **40** | 220 μμf. |
| Capacitor **42** | 390 μμf. |
| Capacitor **64** | 10 μμf. |
| Capacitor **66** | 10 μμf. |
| Capacitor **70** | 100 μμf. |
| Capacitor **72** | 68 μμf. |
| Capacitor **73** | 0.47 μf. |
| Resistor **32** | 100,000 Ω. |
| Resistor **30** | 12,000 Ω. |
| Resistor **26** | 2,200 Ω. |
| Resistor **44** | 56,000 Ω. |
| Resistor **52** | 10,000 Ω. |
| Resistor **54** | 2,200 Ω. |
| Resistor **68** | 2,700 Ω. |
| Inductor **38** | Resonated with capacitors **40** and **42** at 2.7 mc. |
| Inductor **62** | Resonated with capacitors **64** and **66** at 1.8 mc. |
| Battery **28** | 12 volts. |

Figure 2:
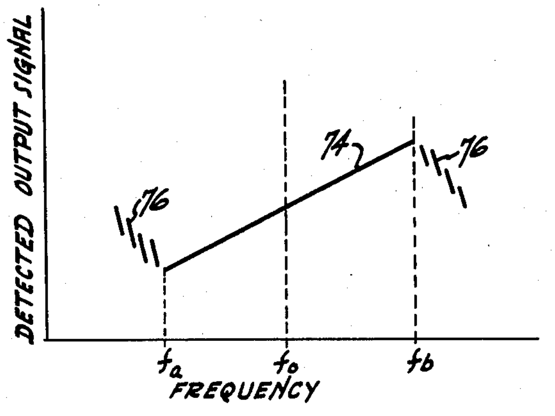
Figure 2 is a graph showing a curve illustrating certain operational characteristics of the circuit of Figure 1.

Referring now to Figure 2, the curve 74 illustrates the overall action of the circuit. The detected output signal that is available across the output resistor 68 is plotted against the frequency deviations of the oscillations that exist in the oscillator-detector circuit 12. It will be noted that at $f_0$, the normal center frequency of 1.8 mc., the output signal is at its normal or middle value. A deviation toward $f_2$, a higher frequency, produces more output signal, while a deviation toward $f_1$ produces less output signal. The broken portions 76 at either end of the straight line portion 74 indicate that the detector "breaks out" at deviations beyond its design maximum and provides no detected output signal. This is not a serious problem, however, since as has been previously explained, the maximum deviation to be detected is reduced from ±25 kc. to ±10 kc. as the frequency is reduced from 4.5 to 1.8 mc. through the limiter-detector circuit.

It will be noted particularly that the limiting action is provided without driving the mixer-limiter transistor 22 into collector current saturation. This ensures that the feedback capacitance between collector and base in the mixer-limiter transistor 22 does not change appreciably over a cycle of the FM wave. Additionally, the output circuit of the mixer-limiter circuit 10 is tuned to a different frequency than that appearing in the input circuit which further reduces the effect that the internal feedback capacitances of the transistor 22 may have for causing unstable operation in the mixer-limiter circuit 12.

The particular frequencies that have been chosen for the mixer and oscillator are by no means the only frequencies that may be used. A different choice of locking ratio between the difference frequency and the oscillator frequency may be made. For instance, for the same 4.5 mc. input wave, the oscillator frequency may be set to 1.5 mc. and the tank 36 may be tuned to the difference frequency of 3 mc. In this case, the oscillator will lock in at a two to one ratio between its input and oscillator signal.

Figure 3:
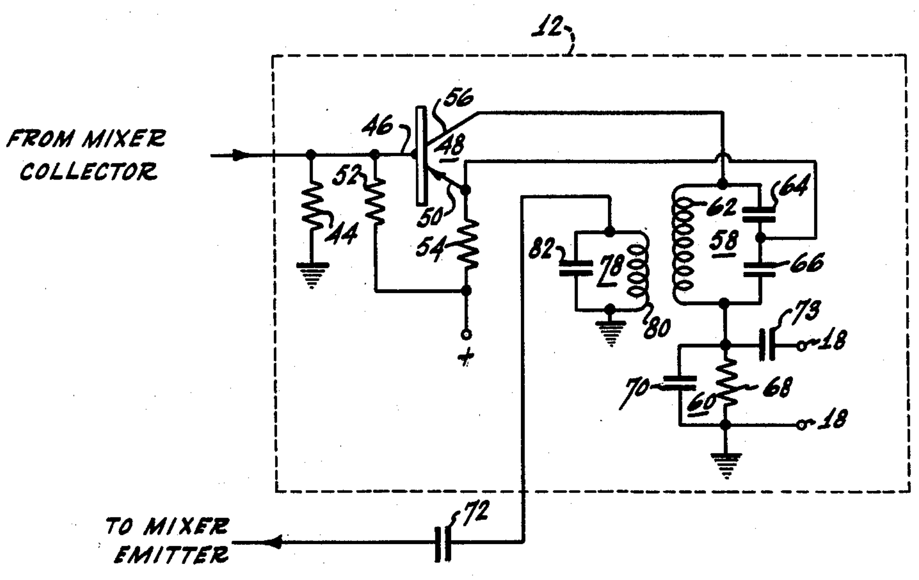
Figure 3 is a schematic circuit diagram illustrating a modification of the circuit shown in Figure 1.

It may be also desirable to operate the oscillator at a lower frequency. A method by which this may be done is illustrated in Figure 3, which is a modification of the oscillator-detector 12 of the circuit shown in Figure 1. The remainder of the circuit shown in Figure 1 has not been reproduced in the interest of simplicity. It will be noted that the oscillator-detector circuit 12 includes many of the same components as shown in Figure 1. It will also be noted, however, that the mixer-limiter signal derived from the oscillator is provided by an auxiliary tuned circuit 78, which includes the inductor 80 and the capacitor 82. One terminal of the tuned circuit 78 is connected to ground while the other terminal is connected to the mixer-limiter circuit 10. The inductor 80 is inductively coupled to the inductor 62 of the second tank circuit 58. By this method the auxiliary tuned circuit 78 may be tuned to the desired 1.8 mc. signal for the mixer-limiter circuit 10 that was used in the circuit of Figure 1, while the oscillator circuit may be made to oscillate at some lower frequency, as an example, .9 mc. Thus, the second harmonic of the oscillator signal may be used to drive the mixer-limiter stage 10, and the difference frequency signal locks the oscillator signal at a ratio of three to one, rather than at a ratio of three to two, as the circuit of Figure 1. The operation of the circuit, other than the differences just described, is the same as that described with reference to Figure 1.

If more limiting is desired than can be obtained with one stage of mixing and limiting, two or more stages of mixing and limiting may be provided. Such a system is shown by block diagram in Figure 4. An FM wave from FM signal source 14 is applied to a first mixer-limiter circuit 10, which may be identical to the structure shown in Figure 1. The first mixer-limiter circuit 10 instead of driving the oscillator-detector circuit 12 of Figure 1, is driving a second mixer-limiter circuit 10', and the second mixer-limiter circuit 10', in turn, is driving the oscillator-detector circuit 12. It should be emphasized that both mixer-limiter circuits 10 and 10' may be identical to the mixer-limiter circuit 10 shown in Figure 1, with the exception of the tuning, to be hereinafter mentioned, and the oscillator-detector circuit 12 is identical to that shown in Figure 1, again with the exception of the tuning of the oscillator.

Figure 4:
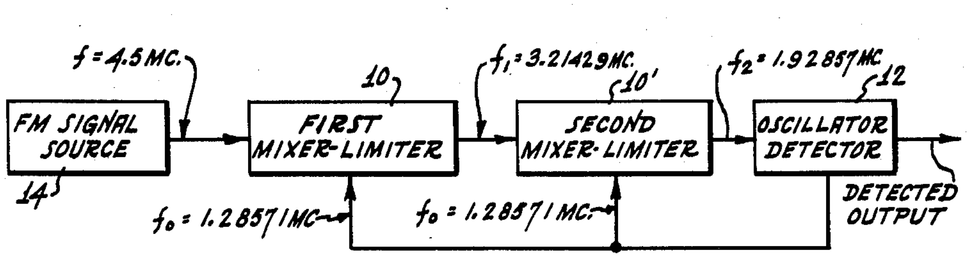
Figure 4 is a circuit diagram illustrating another embodiment of the invention.

When two stages of mixer-limiting are provided, it is necessary to provide a different frequency relationship than that shown and described with reference to Figure 1. The frequency relationships in this circuit will then be given by the following equations: $f-f_0=f_1$; $f_1-f_0=f_2$; and $f_2=Kf_0$, where $f$ is the frequency of the wave to be demodulated, $f_1$ is the first difference frequency, $f_2$ the second difference frequency, $f_0$ the frequency of oscillations, and K the locking ratio between $f_2$ and $f_0$. If an input signal wave of 4.5 mc. is used and a locking ratio K of three to two is chosen, the resultant frequencies are as indicated in Figure 4. Thus the oscillator is operating at a frequency of 1.28571 mc. or $1\frac{8}{14}$ mc. This signal is applied to the first mixer-limiter 10 along with the 4.5 mc. input wave. The first difference frequency is thus equal to approximately 3.21429 mc. or $\frac{45}{14}$ mc. The first difference frequency signal is applied as one of the input signals to the second mixer-limiter circuit 10'. The other input signal to the second mixer-limiter circuit 10' is the oscillater signal at the frequency of 1.28571 mc. The output signal of the second mixer-limiter circuit 10' is the difference between these two input signals and is approximately 1.92857 mc. or $\frac{27}{14}$ mc. This signal is again three halves of the oscillator signal and locks the oscillator 12 at this ratio.

A three halves locking ratio in the oscillator-detector circuit is not necessary and any other suitable ratio may be used, such as the alternate two to one ratio described with reference to Figure 1. If a two to one ratio is used in the circuit of Figure 4, the oscillator frequency would be equal to 1.125 mc., the first difference frequency would be equal to 3.375 mc., and the second difference frequency would be equal to 2.25 mc.

What is claimed is:

1. A frequency variation response circuit for demodulating a wave frequency modulated in accordance with a modulating signal, comprising in combination: oscillator means for generating oscillations at a frequency less than the frequency of said wave, signal mixing means adapted to receive a pair of input signals, means for applying said wave to said signal mixing means, means for applying said oscillations to said signal mixing means, means for deriving a difference frequency signal from said signal mixing means having a frequency equal to the difference between the frequency of said wave and the frequency of said oscillations, means for applying said difference frequency signal to said oscillator means as a locking signal therefor, and means for deriving a demodulated output signal from said oscillator responsive to the phase shift between said locking signal and said oscillations as said wave deviates in frequency.

2. A frequency variation response circuit for demodulating a frequency modulated wave, comprising in combination: signal mixing means adapted to receive a pair of input signals, means for applying said frequency modulated wave to said signal mixing means, oscillator means for generating oscillations having a frequency less than the frequency of said frequency modulated wave, means for applying said oscillations to said signal mixing means, means for deriving a difference signal from said signal mixing means having a frequency equal to the difference between the frequency of said wave and the frequency of said oscillations, means for applying said difference signal to said oscillator means as a locking signal therefor, and means for deriving a demodulated output signal from said oscillator.

3. A frequency variation response circuit for demodulating a frequency modulated wave, comprising in combination: signal mixing means adapted to receive a pair of input signals, means for applying said frequency modulated wave to said signal mixing means, oscillator means for generating oscillations having a frequency less than the frequency of said frequency modulated wave, means for applying said oscillations to said signal mixing means, means for deriving a difference signal from said signal mixing means having a frequency equal to the difference between the frequency of said wave and the frequency of said oscillations, means for applying said difference signal to said oscillator means to lock the instantaneous frequency of said oscillations to the frequency deviations of said frequency modulated wave, and means responsive to the phase shift between said oscillator signal and said difference signal as said frequency modulated wave is deviated for deriving a demodulated output signal from said oscillator.

4. A detector circuit for demodulating a wave having frequency deviations in accordance with a modulating signal comprising in combination, a signal mixer circuit adapted to receive two input signals and develop an output signal having a frequency equal to the difference of the frequencies of the input signals, means for applying said wave having frequency deviations as one input signal to said signal mixer circuit, oscillator means for generating oscillations of a frequency less than the frequency of said wave by an amount such that the difference between the frequency of said wave and said oscillations bears an integral harmonic relationship of the third harmonic or greater to half the frequency of said oscillations, means for applying said oscillations to said signal mixer circuit as another input signal thereto, means for applying the output signal of said signal mixer circuit to said oscillator means to deviate the frequency of said oscillator in accordance with the deviations of the output signal of said mixer circuit, and means for deriving a demodulated output signal from said oscillator means.

5. A detector circuit for demodulating a wave having ferquency deviations in accordance with a modulating signal comprising in combination, a first transistor having emitter, collector, and base electrodes, means for applying said wave having frequency deviations to the base to emitter circuit of said transistor, oscillator means including a second transistor having emitter, collector, and base electrodes for generating oscillations of a frequency less than the frequency of said wave by an amount such that the difference between the frequency of said wave and said oscillations bears an integral harmonic relationship of the third harmonic or greater to half the frequency of said oscillations, means for applying said oscillations to the base to emitter circuit of said first transistor, means for deriving a difference signal from the collector electrode of said first transistor, means for applying said difference signal to said oscillator means to deviate the frequency of said oscillations in accordance with the deviations of said difference signal, and means for deriving a demodulated output signal from said oscillator means.

6. A frequency variation response circuit to limit and demodulate a frequency modulated wave comprising in combination: a signal mixing transistor having base, emitter, and collector electrodes; means for applying said frequency modulated wave between the emitter and base electrodes of said signal mixing transistor; an oscillator transistor having base, emitter, and collector electrodes; circuit means connected with the electrodes of said oscillator transistor for generating oscillations having a frequency less than the frequency of said frequency modulated wave such that the difference frequency between said oscillations and said frequency modulated wave bears an integral harmonic relationship of the third harmonic or greater to half the frequency of said oscillations; means for applying said oscillations between the emitter and base electrodes of said signal mixing transistor; means for deriving an output signal from the collector electrode of said signal mixing transistor having a frequency equal to the difference between the frequency of said frequency modulated wave and said oscillations; means for applying the output signal of said signal mixing transistor to the base electrode of said oscillator transistor; and means for deriving a demodulated output signal from the variations in the collector current of said oscillator transistor.

7. A frequency variation response circuit to limit and demodulate a frequency modulated wave comprising in combination: a signal mixing transistor having base, emitter, and collector electrodes, means for applying said frequency modulated wave to the base electrode of said signal mixing transistor; an oscillator circuit including a transistor having base, emitter, and collector electrodes for generating oscillations having a frequency less than the frequency of said frequency modulated wave such that the difference frequency between said oscillations and said frequency modulated wave bears an integral harmonic relationship of the third harmonic or greater to half the frequency of said oscillations; means for applying said oscillations to the emitter electrode of said signal mixing transistor, means for deriving an output signal from said signal mixer transistor having a frequency equal to the difference between the frequency of said frequency modulated wave and said oscillations; means for applying the output signal of said signal mixer transistor to said oscillator circuit as a locking signal therefor; and means for deriving a demodulated output signal from said oscillator circuit.

8. A detector circuit for limiting and demodulating a frequency modulated wave comprising in combination, a signal mixer circuit including a first transistor having base, emitter, and collector electrodes, a second transistor having base, emitter, and collector electrodes, means connected with the electrodes of said second transistor for generating oscillations of a frequency less than the frequency of said frequency modulated wave by an amount such that the difference between the frequency of said frequency modulated wave and said oscillations bears an integral harmonic relationship of the third harmonic or greater to half the frequency of said oscillations, means for applying said frequency modulated wave to a base electrode of said first transistor device, means for applying said oscillations to the emitter electrode of said first transistor, means for deriving a difference signal from the collector electrode of said first transistor having a frequency equal to the difference between the two signals applied to said first transistor, means for applying said difference signal to the base electrode of said second transistor for locking the instantaneous frequency of said oscillations into the instantaneous frequency of said frequency modulated wave, and means for deriving a demodulated output signal from the variations in the average collector current of said second transistor as said frequency modulated wave deviates.

9. A detector circuit for limiting and demodulating a frequency modulated wave comprising in combination, a signal mixer circuit including a first transistor having base, emitter, and collector electrodes, oscillator means including a transistor having base, emitter, and collector electrodes for generating oscillations of a frequency less than the frequency of said frequency modulated wave by an amount such that the difference between the frequency of said frequency modulated wave and said oscillations bears an integral harmonic relationship of the third harmonic or greater to half the frequency of said oscillations; means for applying said frequency modulated wave to a base electrode of said first transistor, means for applying said oscillations to the emitter electrode of said transistor, circuit means for deriving from the collector electrode of said first transistor a difference signal having a frequency equal to the difference between the frequency of said wave and said oscillations applied to said first transistor; means for applying said difference frequency signal to the base electrode of said second transistor for locking the frequency of said oscillations into the frequency deviations of said frequency modulated wave; and means for deriving a demodulated output signal from the variations in the frequency of said second transistor as said frequency modulated wave deviates.

No references cited.